United States Patent
Miyazaki

(10) Patent No.: US 10,805,484 B2
(45) Date of Patent: *Oct. 13, 2020

(54) IMAGE PROCESSING DEVICE TO EXECUTE COMMUNICATION PROCESSING WITH INFORMATION PROCESSING DEVICE, NON-TRANSITORY COMPUTER-READABLE RECORDING MEDIUM FOR IMAGE PROCESSING DEVICE, AND IMAGE PROCESSING SYSTEM

(71) Applicant: BROTHER KOGYO KABUSHIKI KAISHA, Nagoya-shi, Aichi (JP)

(72) Inventor: Sadaaki Miyazaki, Nagoya (JP)

(73) Assignee: BROTHER KOGYO KABUSHIKI KAISHA, Nagoya-Shi, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/556,913

(22) Filed: Aug. 30, 2019

(65) Prior Publication Data

US 2019/0387113 A1    Dec. 19, 2019

Related U.S. Application Data

(63) Continuation of application No. 15/878,576, filed on Jan. 24, 2018, now Pat. No. 10,404,871.

(30) Foreign Application Priority Data

Jan. 30, 2017 (JP) .................................. 2017-014488

(51) Int. Cl.
*G06F 3/12* (2006.01)
*H04N 1/00* (2006.01)

(52) U.S. Cl.
CPC ..... *H04N 1/00411* (2013.01); *H04N 1/00217* (2013.01); *H04N 1/00474* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 5,699,494 A | * | 12/1997 | Colbert | G06F 3/1204 358/1.15 |
| 2012/0069380 A1 | * | 3/2012 | Sugimoto | G06F 3/1292 358/1.14 |

(Continued)

FOREIGN PATENT DOCUMENTS

JP    2012-070068 A    4/2012

OTHER PUBLICATIONS

U.S. Office Action dated Dec. 10, 2018 issued in U.S. Appl. No. 15/878,576.

(Continued)

*Primary Examiner* — Henok Shiferaw
(74) *Attorney, Agent, or Firm* — Scully Scott Murphy and Presser

(57) ABSTRACT

An image processing device may display a first display screen including a first image on a touch screen. The first image may be for accepting a display switching instruction to switch the first display screen to a second display screen. The image processing device may generate first screen data which enables a display of the information processing device to display the first display screen. The image processing device may send the generated first screen data in a case where first request information is received from the information processing device. The image processing device may receive coordinate information indicating a position within the first display screen where an input operation has (Continued)

been inputted. The image processing device may switch to the second display screen associated with the first image in a case where the position indicated by the coordinate information is within the display area of the first image.

16 Claims, 14 Drawing Sheets

(56) References Cited

U.S. PATENT DOCUMENTS

2012/0327443 A1* 12/2012 Fujii .................. H04N 1/00222
358/1.13
2015/0091830 A1* 4/2015 Miyazaki .............. G06F 3/0416
345/173

OTHER PUBLICATIONS

Notice of Allowance dated Apr. 25, 2019 issued in U.S. Appl. No. 15/878,576.

* cited by examiner

```
<input type="button" value="stop"
onclick="stopkey(event)">
function stopkey(e){
 var send_form=document.createElement("form");
 send_form.action="TEST or SAMPLE";
 send form.method="POST";
 document.body.appendChild(send_form);
 var fld1 = document.createElement("input");
 fld1.name = "param";
 fld1.type = "hidden";
 fld1.value = "STOP";
 send_form.submit( );
}
```

IMAGE PROCESSING DEVICE TO EXECUTE COMMUNICATION PROCESSING WITH INFORMATION PROCESSING DEVICE, NON-TRANSITORY COMPUTER-READABLE RECORDING MEDIUM FOR IMAGE PROCESSING DEVICE, AND IMAGE PROCESSING SYSTEM

CROSS-REFERENCE TO RELATED APPLICATION

This application is a continuation application of U.S. patent application Ser. No. 15/878,576 filed on Jan. 24, 2018 and claims priority under 35 U.S.C. § 119 from Japanese Patent Application No. 2017-014488 filed on Jun. 24, 2016. The entire subject matter of the applications is incorporated herein by reference.

TECHNICAL FIELD

The technique disclosed herein relates to an image processing device configured to display various images.

BACKGROUND

A system that controls an image processing device using an information processing device by remote control is known. In this system, the information processing device displays an operation screen received from the image processing device on its display, accepts operations inputted by a user according to the operation screen, and sends instructions corresponding to the inputted operation to the image processing device. The image processing device displays a screen corresponding to the instruction received from the information processing device.

SUMMARY

To realize a remote control system, a program for communicating various types of commands dedicated to remote control needs to be stored in a memory of an image processing device. When a size of this program is large with respect to a memory capacity of the image processing device, much of the memory capacity may be occupied by this program.

One technique disclosed in the present application is an image processing device. The image processing device may comprises: a communication interface for executing communication with an information processing device; a touch screen; a memory storing computer-readable instructions; and a controller. The computer-readable instructions, when executed by the controller, may cause the image processing device to perform displaying a first display screen including a first image on the touch screen. The first image may be an image for accepting an input of a display switching instruction to switch the first display screen to a second display screen. The computer-readable instructions may cause the image processing device to perform generating first screen data, which represents the first display screen displayed in the displaying, and which enables a display of the information processing device to display the first display screen. The computer-readable instructions may cause the image processing device to perform sending the generated first screen data to the information processing device via the communication interface in a case where first request information is received via the communication interface from the information processing device. The computer-readable instructions may cause the image processing device to perform receiving coordinate information via the communication interface from the information processing device. The coordinate information may indicate a position within the first display screen where an input operation has been inputted. The computer-readable instructions may cause the image processing device to perform determining whether or not the position indicated by the coordinate information is within a display area of the first image. The computer-readable instructions may cause the image processing device to perform switching to the second display screen associated with the first image in a case where the position indicated by the coordinate information is within the display area of the first image.

DETAILED DESCRIPTION

Figure 1:
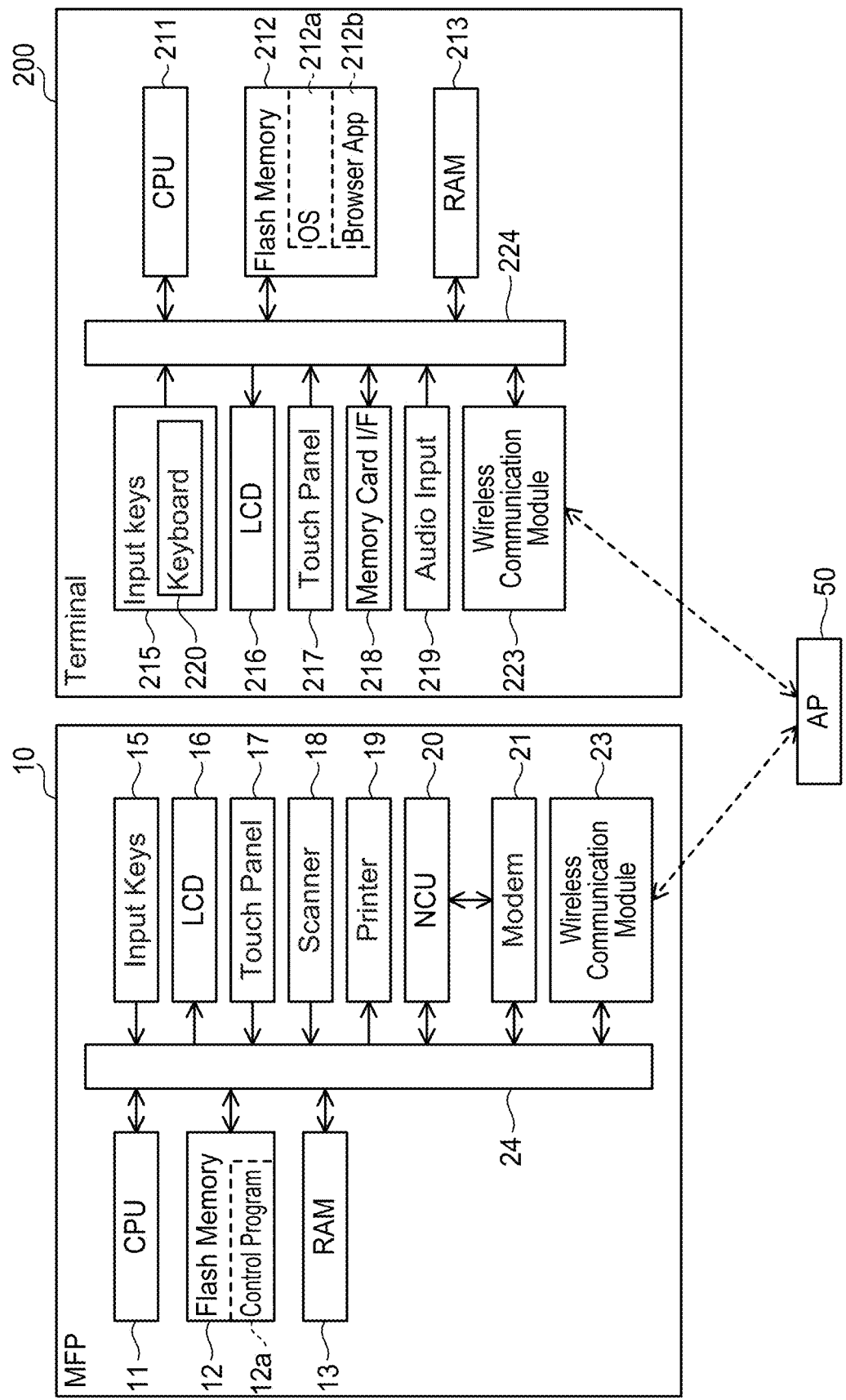
FIG. 1 is a block diagram showing an electric configuration of an image processing system 1.

FIG. 1 shows a block diagram of an electric configuration of an image processing system 1. The image processing system 1 includes a multifunction peripheral (hereinbelow termed "MFP") 10, and a terminal 200 configured capable of communicating with the MFP 10.

<Configuration of MFP 10>

The MFP 10 has various functions, such as printing function, scan function, copy function, facsimile function, and the like. The MFP 10 is configured capable of executing processes related to these functions according to a remote control from the terminal 200, which is installed with a browser application (hereinbelow termed "browser app") 212b.

The MFP 10 is provided with a CPU 11, a flash memory 12, a RAM 13, input keys 15, an LCD 16, a touch panel 17, a scanner 18, a printer 19, an NCU 20, a modem 21, and a wireless communication module 23. These members are connected to each other via an input/output port 24. The CPU 11 controls the respective functions endowed to the MPF 10, and the respective members connected to the input/output port 24 according to fixed values, programs, data stored in the RAM 13, or various signals sent and received through the NCU 20.

The flash memory 12 is a nonvolatile memory, which stores a control program 12a and the like for controlling operations of the MFP 10. Respective processes shown in flow charts of FIGS. 2 to 7 are processes that the CPU 11 executes according to the control program 12a. Further, the flash memory 12 stores a plurality of screen data representing plural types of screens that can be displayed on the LCD 16. The RAM 13 is a rewritable volatile memory including a temporary area for temporarily storing various types of data when the CPU 11 executes the control program 12a.

Figures 12, 13:
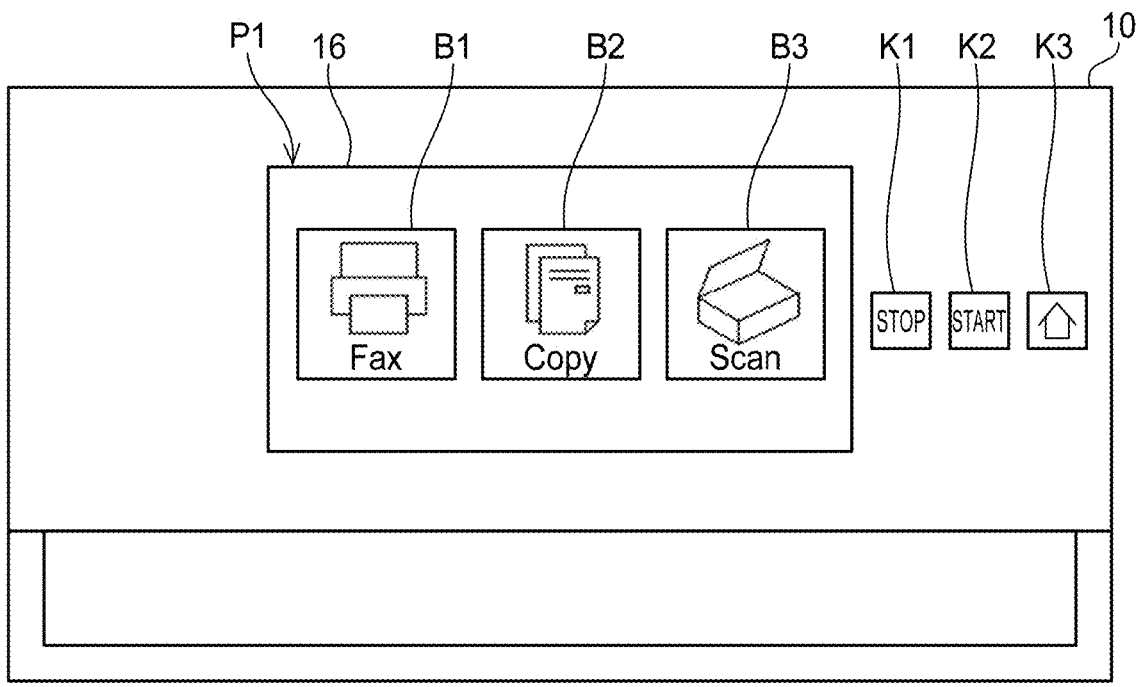
FIG. 12 is a diagram showing an example of input keys and a home screen.
FIG. 13 is a diagram showing an example of a cgi script.

The input keys 15 are mechanical keys provided on a housing of the MFP 10. In the embodiment explained herein, as shown in FIG. 12, a case will be described in which the input keys 15 include a STOP key K1, a START key K2, and a HOME key K3. The STOP key K1 is a key for stopping various processes being executed in the MFP 10. The START key K2 is a key for starting various processes. The HOME key K3 is a key for displaying a home screen P1 on the LCD 16.

The LCD 16 is a liquid crystal display, and displays various screens thereon. A screen of the LCD 16 has the touch panel 17 provided to overlap the LCD 16. A touch screen is thereby configured. The touch panel 17 detects that a press operation is inputted when an indicator such as a finger or a stick is brought close to or into contact with the screen of the LCD 16, and outputs a press coordinate indicating a pressed position. Further, when the indicator such as the finger or a stick, which had been close to or in contact with the screen of the LCD 16, is withdrawn away therefrom, the touch panel 17 detects that a release operation is inputted, and outputs a release coordinate indicating a released position. The scanner 18 scans a document and converts the same into image data. The printer 19 prints an image based on image data on a recording medium sheet. The modem 21 modulates image data to be sent upon FAX transmission into transmittable signals and sends the same through the NCU 20, or demodulates signals inputted through the NCU 20 from a telephone network (not shown) into image data. The NCU 20 connects the telephone network that is not shown and the MFP 10, and controls connection states with the telephone network by connecting or disconnecting its line according to instructions from the modem 21.

The wireless communication module 23 is an interface for performing a wireless communication using a wireless LAN. In this embodiment, the communication performed by the wireless communication module 23 is a wireless communication by a wireless LAN, complying to the standards of IEEE 802.11b/g/n. In this embodiment, the wireless communication module 23 connects with the terminal 200 using a wireless communication (hereinbelow termed "Wi-Fi communication") complying to the Wi-Fi (registered trademark) standard under an infrastructure mode using an access point (hereinbelow termed "AP") 50 being a relay device. In the description below, the communication carried out between the MFP 10 and the terminal 200 is a Wi-Fi communication through the AP 50, unless described otherwise.

<Configuration of Terminal 200>

In this embodiment, a case will be described in which the terminal 200 is a PC (personal computer). The terminal 200 primarily includes a CPU 211, a flash memory 212, a RAM 213, input keys 215, an LCD 216, a touch panel 217, a memory card interface (memory card I/F) 218, an audio input 219, and a wireless communication module 223. These modules are connected to each other via an input/output port 224. The CPU 211 controls the respective members connected to the input/output port 224 according to fixed values and programs stored in the flash memory 212.

The flash memory 212 is a rewritable nonvolatile memory. The flash memory 212 stores an operating system 212a and the browser app 212b. The operating system 212a is a basic software for realizing standard functions of the terminal 200. In this embodiment, Windows (registered trademark) OS is employed as an example of the operating system 212a. The browser app 212b is an application program for receiving HTML documents and the like from a Web server and displaying the same. Notably, respective processes shown in flow charts of FIGS. 8 to 11 are processes executed by the CPU 211 according to the browser app 212b.

The input keys 215 are mechanical keys provided on a housing of the terminal 200, and receive various set values and instructions from the user. The input keys 215 include a keyboard 220. The LCD 216, the touch panel 217, and the wireless communication module 223 perform similar operations as the aforementioned LCD 16, touch panel 17, and wireless communication module 23. The memory card I/F 218 is an interface to which a rewritable nonvolatile memory card (not shown) is to be mounted, and controls data read and write operations of the memory card. The audio input 219 is an audio input device such as an internal microphone.

In this description, the "operating system" may be termed "OS". Further, in this description, the CPU 211 executing applications or programs such as the operating system may be referred to by the name of the program. For example, "the application" may mean "the CPU 211 executing the application".

<Operation of Image Processing System 1>

In the image processing system 1 of FIG. 1, the MFP 10 functions as a Web server, and the browser app 212b of the terminal 200 functions as a client. One of characteristics of the technique described herein is that remote control of the MFP 10 using the terminal 200 is enabled by using such a Web server and a client. In the technique described herein, a screen including identical contents as a screen displayed on the LCD 16 of the MFP 10 can be displayed with the browser app 212b of the terminal 200 as a "virtual screen". Further, operations inputted to the virtual screen of the browser app 212b can be inputted to the MFP 10.

<Operation of MFP 10>

An operation of the MFP 10 will be described with reference to FIGS. 2 to 7. The processes of FIGS. 2 to 7 are started on condition that a preparation process for enabling the remote control is completed between the terminal 200 and the MFP 10.

The preparation process will be described. The preparation process starts with the user operating the MFP 10 to enable the remote control. Then, the user operates the terminal 200 to activate the browser app 212b, and instructs the terminal 200, in which the browser app 212b has been activated, to search for the remote control-enabled MFP 10.

The terminal 200 registers the MFP 10 as a target device for the remote control in the terminal 200. The terminal 200 sends registration information indicating that the registration has been made, an IP address of the terminal 200, and the like to the registered MFP 10 through a Wi-Fi communication. Once these are received, the MFP 10 establishes a communication link with the terminal 200. The preparation process is completed when this communication link is established. As a result, the MFP 10 comes to be in a state of being capable of the remote control from the terminal 200.

In S10, the CPU 11 displays the home screen on the LCD 16. FIG. 12 shows an example of the home screen P1. The home screen P1 includes button images B1 to B3. The button images B1 to B3 are images respectively for accepting an execution instruction for a FAX process, a copy process, and a scan process. Further, the button images B1 to B3 are images respectively for accepting an input of a display switching instruction for switching the home screen P1 to a FAX screen, a copy screen, and a scan screen. Hereinbelow, as an example thereof, the operation for a case where the home screen P1 is displayed on the LCD 16 will be described.

In S15, the CPU 11 determines whether or not an http(s) request has been received from the terminal 200. The http(s) request functions as information for requesting the MFP 10 to send screen data that represents the screen being displayed on the LCD 16 of the MFP 10 to the terminal 200. When an affirmative determination is made in S15 (S15: YES), the CPU 11 proceeds to S20.

In S20, the CPU 11 executes a screen data sending process. After this, the CPU 11 returns to S15. The screen data sending process is a series of processes for sending the screen data and an html script for causing the browser app 212b of the terminal 200 to perform various operations to the terminal 200. Contents of the screen data sending process will be described later with reference to FIG. 3.

On the other hand, when a negative determination is made in S15 (S15: NO), the CPU 11 proceeds to S30. In S30, the CPU 11 determines whether or not an http(s) cgi request including screen press information and press coordinate information is received from the terminal 200. The http(s) cgi request is information for requesting the MFP 10, that is the Web server, to execute a program, and to return an execution result of the program to the browser app 212b that is the client. The screen press information is information indicating that a position within the home screen P1 displayed on the LCD 16 of the MFP 10 has been pressed by a remote operation from the terminal 200. The press coordinate information is information indicating the pressed position on the home screen P1. When an affirmative determination is made in S30 (S30: YES), the CPU 11 proceeds to S40.

In S40, the CPU 11 executes a screen pressing process. The CPU 11 then returns to S15. The screen pressing process is a series of processes for executing processes according to the press coordinate information in the MFP 10 and to send an html script and screen data to the terminal 200. Contents of the screen pressing process will be described later with reference to FIG. 4.

On the other hand, when a negative determination is made in S30 (S30: NO), the CPU 11 proceeds to S50. In S50, the CPU 11 determines whether or not an http(s) cgi request including release information and release coordinate information is received from the terminal 200. The release information is information indicating that a release operation has been inputted to a position within the home screen P1 displayed in the LCD 16 of the MFP 10 by a remote operation from the terminal 200. The release coordinate information is information indicating the position where the indicator that had been in contact was drawn away therefrom in the home screen P1. When an affirmative determination is made in S50 (S50: YES), the CPU 11 proceeds to S60.

In S60, the CPU 11 executes a releasing process. The CPU 11 then returns to S15. The releasing process is a series of processes for executing processes according to the release coordinate information in the MFP 10 and to send an html script and screen data to the terminal 200. Contents of the releasing process will be described later with reference to FIG. 5.

On the other hand, when a negative determination is made in S50 (S50: NO), the CPU 11 proceeds to S70. In S70, the CPU 11 determines whether or not a http(s) cgi request including virtual key press information is received from the terminal 200. The virtual key press information is information indicating that one of the input keys 15 provided in the MFP 10 has been pressed by a remote operation from the terminal 200. When an affirmative determination is made in S70 (S70: YES), the CPU 11 proceeds to S80.

In S80, the CPU 11 executes a key pressing process. The CPU 11 then returns to S15. The key pressing process is a series of processes for executing processes according to the pressed input key in the MFP 10 and to send an html script and screen data to the terminal 200. Contents of the key pressing process will be described later with reference to FIG. 6.

On the other hand, when a negative determination is made in S70 (S70: NO), the CPU 11 proceeds to S90. In S90, the CPU 11 determines whether or not a http(s) cgi request including press-release information and press-release coordinate information is received from the terminal 200. The press-release information is information indicating that a position within the home screen P1 displayed in the LCD 16 of the MFP 10 has been pressed and released by remote operations from the terminal 200. The press-release coordinate information is information indicating the position where the pressing and the releasing had taken place. When an affirmative determination is made in S90 (S90: YES), the CPU 11 proceeds to S100.

In S100, the CPU 11 executes a press-release process. The CPU 11 then returns to S15. The press-release process is a series of processes for executing processes according to the press-release coordinate information in the MFP 10 and to send an html script and screen data to the terminal 200. Contents of the press-release process will be described later with reference to FIG. 7.

On the other hand, when a negative determination is made in S90 (S90: NO), the CPU 11 proceeds to S110. In S110, the CPU 11 determines whether or not an http(s) cgi request including text information is received from the terminal 200. The text information is information indicating a letter string inputted in the terminal 200. When a negative determination is made in S110 (S110: NO), the CPU 11 returns to S15, and when an affirmative determination is made therein (S110: YES), the CPU 11 proceeds to S120.

In S120, the CPU 11 determines whether or not a screen being currently displayed on the LCD 16 is a password input screen. The password input screen is a screen for accepting an input of a password letter string. The password input screen may include a screen keyboard image provided with a plurality of keys. When a negative determination is made in S120 (S120: NO), the CPU 11 returns to S15 and when an affirmative determination is made therein (S120: YES), the CPU 11 proceeds to S130.

In S130, the CPU 11 executes a text displaying process. In the text displaying process, the letter string indicated by the text information received in S110 is displayed in the password input screen. Due to this, the input of the password letter string can be accepted without using the screen keyboard image. Thus, which key had been pressed is not shown to the user by the screen keyboard image. Password is prevented from being exposed.

In S140, the CPU 11 generates screen data for a screen after the letter string has been displayed, and stores the same in the RAM 13. The screen data is for example bitmap type data. Further, the CPU 11 sends a http(s) cgi response to the terminal 200.

<Screen Data Sending Process>

Figure 3:
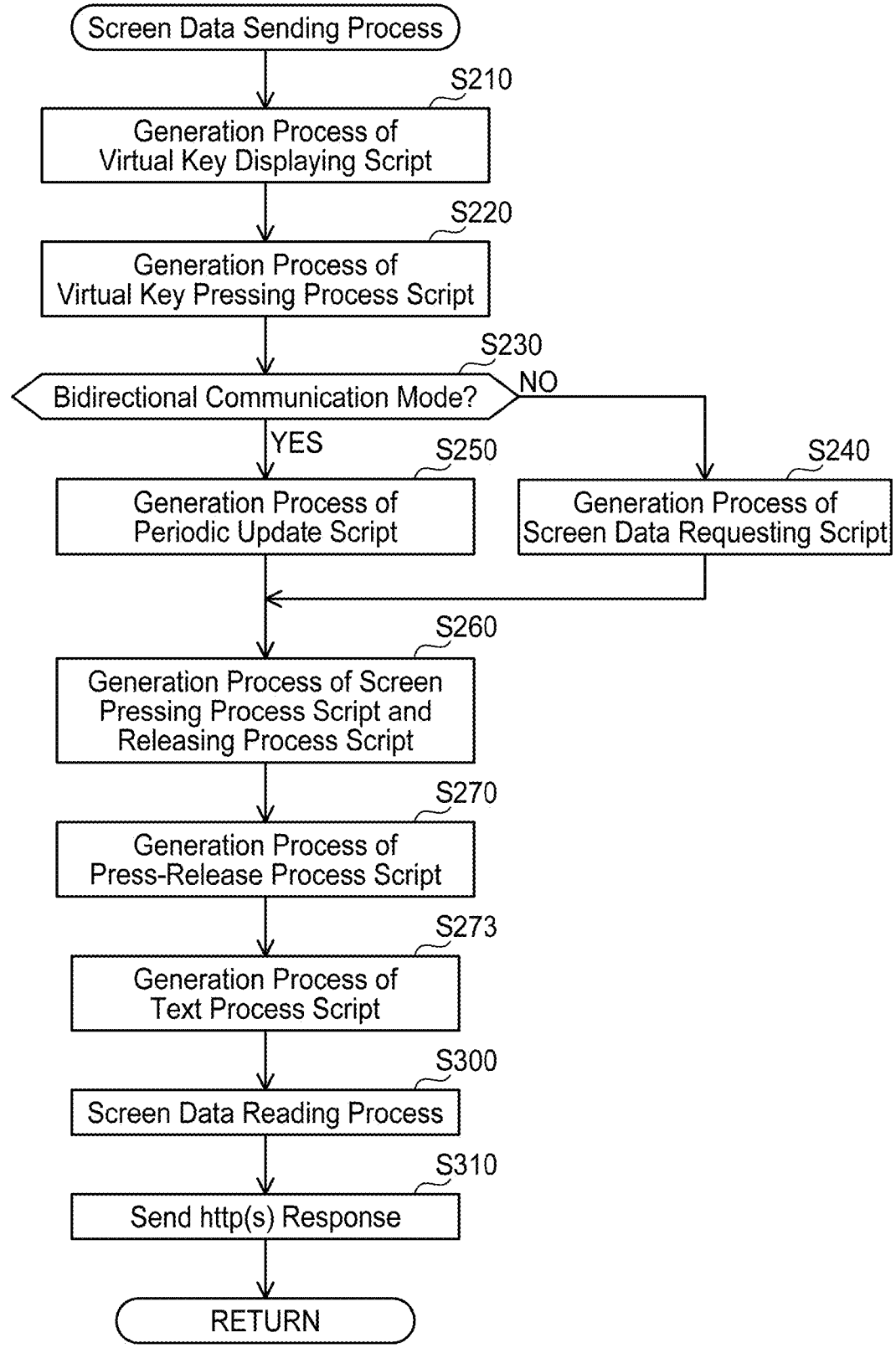
FIG. 3 is a flow chart showing S20 of FIG. 2, which is a part of the operation of the MFP 10.

The contents of the screen data sending process of S20 will be described with reference to FIG. 3. In S210 to S273 of the screen data sending process, a script to be included in a body of the http(s) response is generated. This procedure will be described below in detail.

In S210, the CPU 11 executes a process to generate a virtual key displaying script. The virtual key displaying script is a cgi script for instructing the browser app 212b of the terminal 200 to display virtual keys. The virtual keys virtually show the mechanical keys included in the input keys 15, such as the STOP key K1, the START key K2, and the HOME key K3, on screen. FIG. 13 shows an example of the cgi script for causing the browser app 212b to display the STOP key K1.

In S220, the CPU 11 executes a process to generate a virtual key pressing process script. The virtual key pressing process script is a cgi script for instructing the terminal 200 to send virtual key press information to the MFP 10 when an operation to press the virtual keys in the browser app 212b is accepted in the terminal 200.

In S230, the CPU 11 determines whether or not the MFP 10 is set in a bidirectional communication mode. The bidirectional communication mode is a mode by which screen data representing the displayed screen of the LCD 16 is sent periodically to the terminal 200. The setting of the bidirectional communication mode may freely be set by the user. Due to this, even when the screen being displayed on the LCD 16 of the MFP 10 has changed, the virtual screen displayed by the browser app 212b of the terminal 200 can be changed without delay. When an affirmative determination is made in S230 (S230: YES), the CPU 11 proceeds to S250.

In S250, the CPU 11 executes a process to generate a periodic update script. The periodic update script is a cgi script for instructing the terminal 200 to periodically send an http(s) request that requests for screen data to the MFP 10. The CPU 11 then proceeds to S260.

On the other hand, when a negative determination is made in S230 (S230: NO), the CPU 11 proceeds to S240. In S240, the CPU 11 executes a process to generate a screen data requesting script. The screen data requesting script is a cgi script for instructing the terminal 200 to send the http(s) request requesting the screen data to the MFP 10 on condition that an input operation is accepted in the terminal 200 at a position within the virtual screen that the browser app 212b is displaying. Due to this, the virtual screen can be updated when an input operation is performed on the virtual screen. Thus, identical contents can be displayed on the screen of the MFP 10 and on the virtual screen of the terminal 200. The CPU 11 then proceeds to S260.

In S260, the CPU 11 executes a process to generate a screen pressing process script and a releasing process script. The screen pressing process script is a cgi script for instructing the terminal 200 to send an http(s) cgi request including the screen press information and the press coordinate information to the MFP 10 on condition that a press operation is accepted in the terminal 200 at a position within the virtual screen that the browser app 212b is displaying. Similarly, the releasing process script is a cgi script for instructing the terminal 200 to send an http(s) cgi request including the release information and the release coordinate information to the MFP 10 on condition that a release operation is accepted in the terminal 200.

In S270, the CPU 11 executes a process to generate a press-release process script. The press-release process script is a script that is generated when the browser app 212b is displaying the virtual screen of the password input screen including the screen keyboard image. The press-release process script is a cgi script for instructing the terminal 200 to send an http(s) cgi request including the press-release information and the press-release coordinate information to the MFP 10, on condition that a press operation and a release operation to a key image within the screen keyboard image are accepted in the terminal 200.

In S273, the CPU 11 executes a process to generate a text process script. The text process script is a cgi script for instructing the terminal 200 to send the text information indicating an inputted letter string to the MFP 20 when an operation to input the letter string to a text box displayed on the virtual screen is accepted in the terminal 200.

In S300, the CPU 11 executes screen data reading process. Specifically, screen data stored in the RAM 13 in processes related to S450, S560, S650, and S740 to be described later is read out from the RAM 13.

In S310, the CPU 11 sends the http(s) response to the terminal 200. Further, the CPU 11 sends the screen data read in S300 to the terminal 200. The body of the http(s) response includes various cgi scripts generated in S210 to S273. Further, a header of the http(s) response includes information indicating that the http(s) request received in S15 has succeeded.

<Screen Pressing Process>

Figure 4:
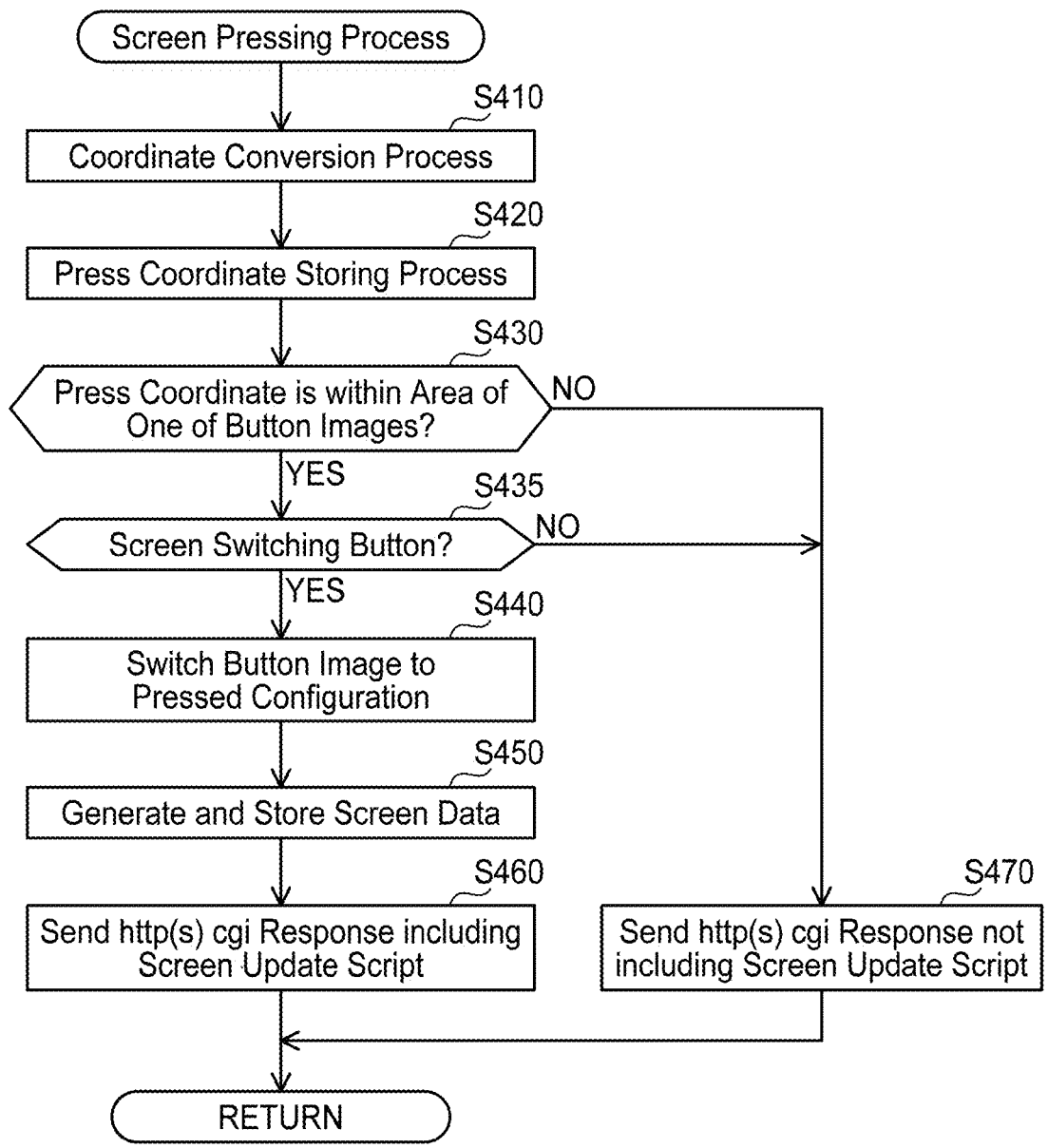
FIG. 4 is a flow chart showing S40 of FIG. 2, which is a part of the operation of the MFP 10.

The contents of the screen pressing process of S40 will be described with reference to FIG. 4. In S410, the CPU 11 executes conversion process of a coordinate indicated by the press coordinate information received in S30. The conversion process is a process for matching the pressed position on the virtual screen of the browser app 212b and a pressed position on the LCD 16 of the MFP 10. For example, in the conversion process, a relative coordinate indicating the pressed position on the virtual screen of the browser app 212b may be converted to an absolute coordinate indicating the pressed position on the LCD 16 of the MFP 10. In S420, the CPU 11 temporarily stores the converted press coordinate in the RAM 13.

In S430, the CPU 11 determines whether or not the stored press coordinate is within a display area of one of the button images B1 to B3. When an affirmative determination is made (S430: YES), the CPU 11 proceeds to S435. In S435, the CPU 11 determines whether or not the button image, within the display area of which the press coordinate is existing, is a button image for switching the screen being currently displayed on the LCD 16. When an affirmative determination is made (S435: YES), the CPU 11 proceeds to S440.

In S440, the CPU 11 switches a display configuration of the button image within the display area of which the press coordinate exists, to a pressed configuration indicating that this button has been pressed. As an example of the pressed configuration, a configuration that changes a color of the button image, or a configuration that changes a shape of the button image to a shape that is dented due to having been pressed in may be exemplified.

In S450, the CPU 11 generates screen data for the home screen P1 in which the pressed button image is displayed in the pressed configuration, and stores the same in the RAM 13. In S460, the CPU 11 sends an http(s) cgi response to the terminal 200. The header of the http(s) cgi response includes information indicating that the http(s) request received in S30 has succeeded. Further, the body of the http(s) cgi response includes a screen update script. The screen update script is a cgi script for instructing the terminal 200 to send an http(s) request requesting screen update to the MFP 10.

On the other hand, when a negative determination is made in S430 or S435 (S430: NO, S435: NO), the CPU 11 proceeds to S470. In S470, the CPU 11 sends an http(s) cgi response to the terminal 200. The header of this http(s) cgi response includes the information indicating that the http(s) request received in S30 has succeeded, but the body thereof does not include the screen update script.

<Releasing Process>

Figure 5:
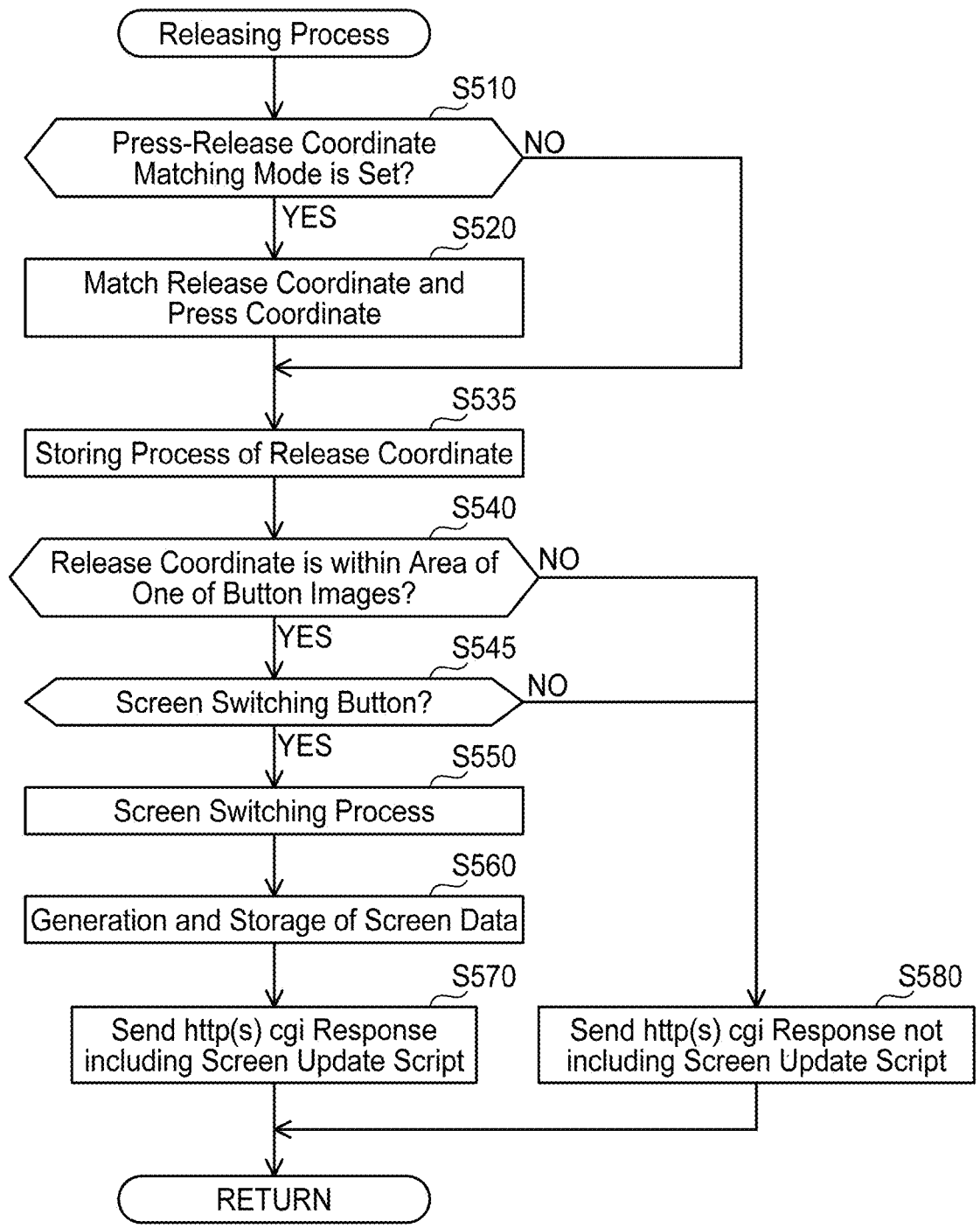
FIG. 5 is a flow chart showing S60 of FIG. 2, which is a part of the operation of the MFP 10.

The contents of the releasing process of S60 will be described with reference to FIG. 5. In S510, the CPU 11 determines whether or not the MFP 10 is set in a press-release coordinate matching mode. The press-release coordinate matching mode is a mode for bringing the release coordinate to match the press coordinate when the press coordinate and the release coordinate are different. In the press-release coordinate matching mode, the processes corresponding to the press coordinate can surely be executed even if the press coordinate and the release coordinate are different. By using the press-release coordinate matching mode, incorrect operations can be prevented from taking place. Setting to turn on or off the press-release coordinate matching mode may be freely enabled to the user.

When a negative determination is made in S510 (S510: NO), the CPU 11 proceeds to S535, and when an affirmative determination is made therein (S510: YES), the CPU 11 proceeds to S520. In S520, the CPU 11 sets the release coordinate to match the press coordinate. Then, the CPU 11 proceeds to S535. In S535, the CPU 11 temporarily stores the release coordinate in the RAM 13.

In S540, the CPU 11 determines whether or not the stored release coordinate is within the area of one of the button images B1 to B3. When an affirmative determination is made therein (S540: YES), the CPU 11 proceeds to S545. In S545, the CPU 11 determines whether or not the button image, within the display area of which the release coordinate is existing, is a button image for switching the screen being currently displayed on the LCD 16. When an affirmative determination is made (S545: YES), the CPU 11 proceeds to S550.

In S550, the CPU 11 executes a screen switching process. Specifically, it switches to a screen in which the release coordinate is associated with the button image within the display area of which the release coordinate is existing. Due to this, when the button image is pressed on the virtual screen of the terminal 200, the pressed button image can be presented in the pressed configuration (S440). Further, when the indicator is released from the pressed button image, the screen can be switched (S550)

In S560, the CPU 11 generates screen data for the screen after the switching in S550, and stores the same in the RAM 13.

The contents of the processes of S570 are same as the contents of the processes of S460 as aforementioned. On the other hand, when a negative determination is made in S540 or S545 (S540: NO, S545: NO), the CPU 11 proceeds to S580. The contents of the processes of S580 are same as the contents of the processes of S470 as aforementioned.

<Key Pressing Process>

Figure 6:
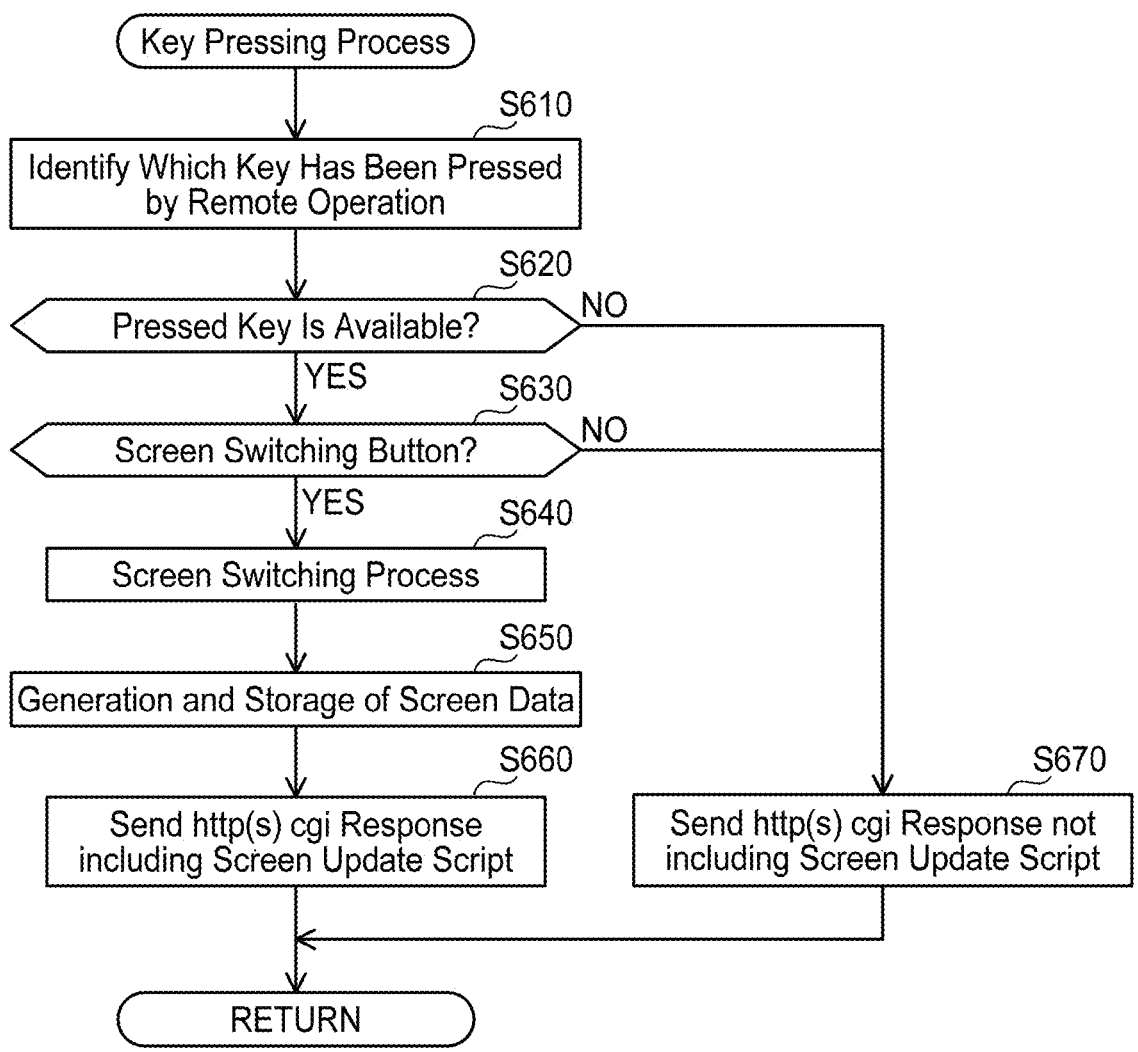
FIG. 6 is a flow chart showing S80 of FIG. 2, which is a part of the operation of the MFP 10.

The contents of the key pressing process of S80 will be described with reference to FIG. 6. In S610, the CPU 11 identifies which one of the STOP key K1 to HOME key K3 has been pressed by remote operation. In S620, the CPU 11 determines whether or not the key pressed by the remote operation is available in the screen being currently displayed on the LCD 16. An example of a case where this key is not available is when the HOME key K3 is pressed by the remote operation when the home screen P1 is already being displayed. When an affirmative determination is made (S620: YES), the CPU 11 proceeds to S630.

In S630, the CPU 11 determines whether or not the pressed key is an image for switching the screen being currently displayed on the LCD 16. When an affirmative determination is made (S630: YES), the CPU 11 proceeds to S640. In S640, the CPU 11 executes the screen switching process. Specifically, it switches to a screen associated with the pressed key. Due to this, the mechanical keys provided in the MFP 10 become available to being remotely operated from the terminal 200.

In S650, the CPU 11 generates screen for the screen after the switching in S640, and stores the same in the RAM 13. The contents of the processes of S660 are same as the contents of the processes of S460 and S570 as aforementioned. On the other hand, when a negative determination is made in S620 or S630 (S620: NO, S630: NO), the CPU 11 proceeds to S670. The contents of the processes of S670 are same as the contents of the processes of S470 and S580 as aforementioned.

<Press-Release Process>

Figure 7:
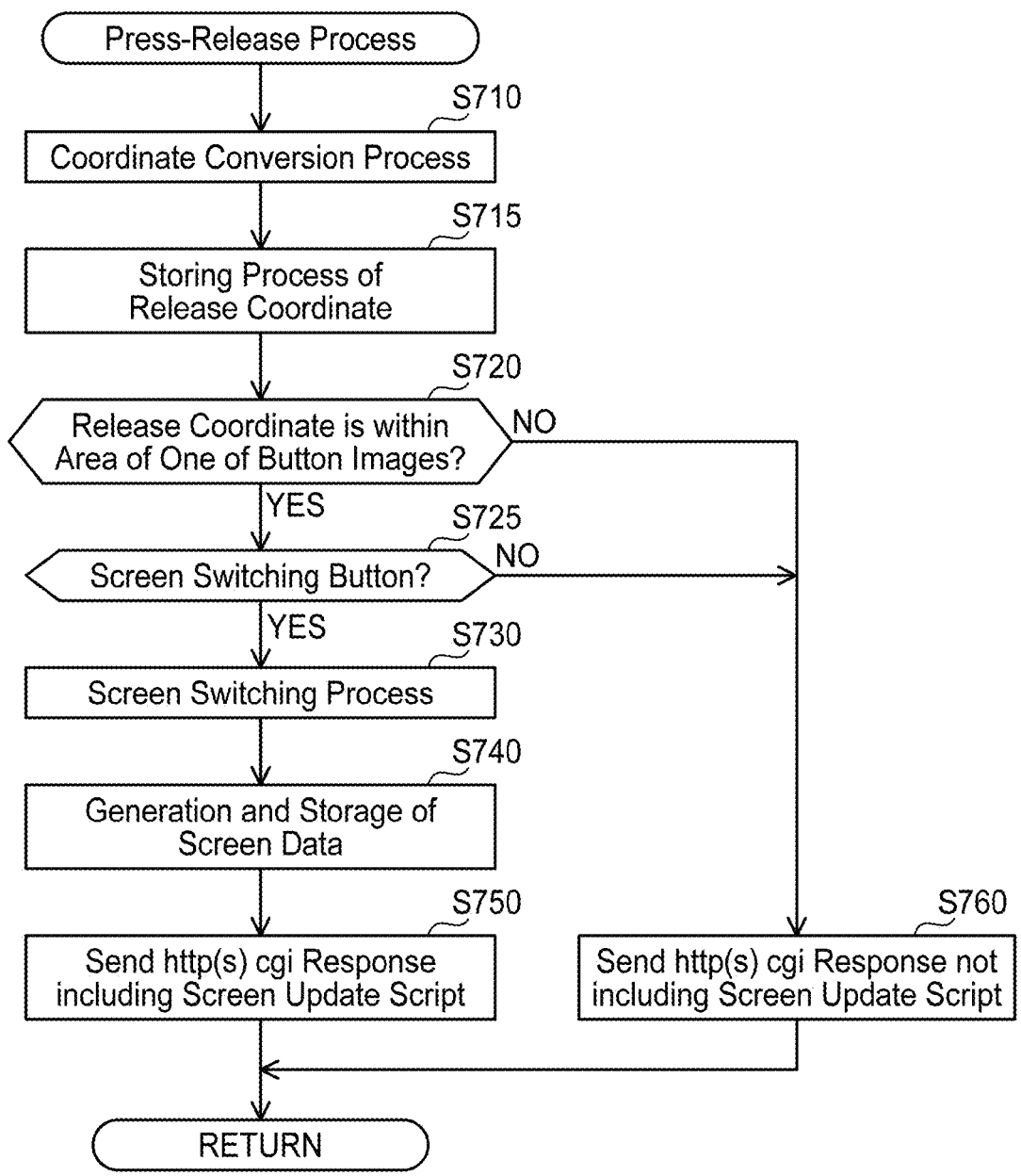
FIG. 7 is a flow chart showing S100 of FIG. 2, which is a part of the operation of the MFP 10.

The contents of the press-release process of S100 will be described with reference to FIG. 7. In S710, the CPU 11 executes the conversion process on the coordinate indicated by the press-release coordinate information received in S90. The contents of the conversion process are described earlier in S410.

The contents of the processes of S715, S720, S725, S730, S740, S750, and S760 are same as the contents of the processes of S535, S540, S545, S550, S560, S570, and S580 as aforementioned. In the screen switching process of S730, the pressing process and the releasing process are executed simultaneously to the button image within which display area the press-release coordinate exists. Due to this, switching to the screen associated with the button image within which display area the press-release coordinate exists can be performed, without switching the display configuration of the button image to the pressed configuration.

<Operation of Terminal 200>

Figure 14:
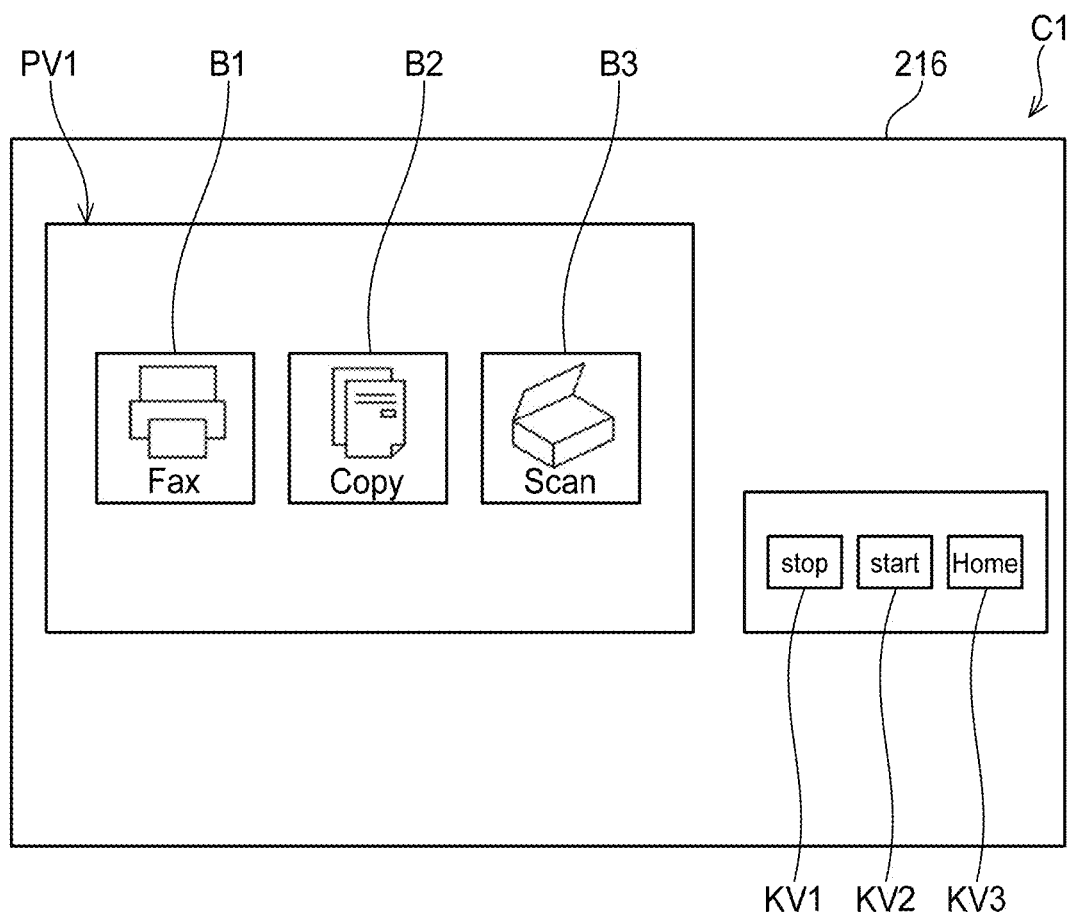
FIG. 14 is a diagram showing an example of a remote control screen in the terminal 200.

An operation of the terminal 200 will be described with reference to FIGS. 8 to 11. Processes of FIGS. 8 to 11 are started on condition that the aforementioned preparation process has been completed. In S800 of FIG. 8, the CPU 11 displays a remote control screen on the LCD 216. FIG. 14 shows an example of a remote control screen C1. The remote control screen C1 includes a virtual screen PV1 and virtual key images KV1 to KV3. In the example of FIG. 14, the virtual screen PV1 is a screen with identical contents as the home screen P1 in FIG. 12. Each of the virtual key images KV1 to KV3 is an image corresponding to one of the STOP key K1 to HOME key K3. The virtual key images KV1 to KV3 virtually show the mechanical keys. Hereinbelow, as an example, the operation in a case where the remote control screen C1 is displayed on the LCD 216 will be described.

In S810, the CPU 211 determines whether or not the MFP 10 is set in the bidirectional communication mode. When a negative determination is made (S810: NO), the CPU 211 proceeds to S840, and when an affirmative determination is made (S810: YES), the CPU 211 proceeds to S820.

In S820, the CPU 211 determines whether or not a predetermined time has elapsed since a screen updating process of S830 was previously executed. When a negative determination is made (S820: NO), the CPU 211 proceeds to S840, and when an affirmative determination is made (S820: YES), the CPU 211 proceeds to S830. In S830, the CPU 211 executes the screen updating process. Due to this, since the screen updating process can be executed periodically, the screen, the identical contents can be displayed on the screen of the MFP 10 and on the virtual screen of the terminal 200.

Figure 10:
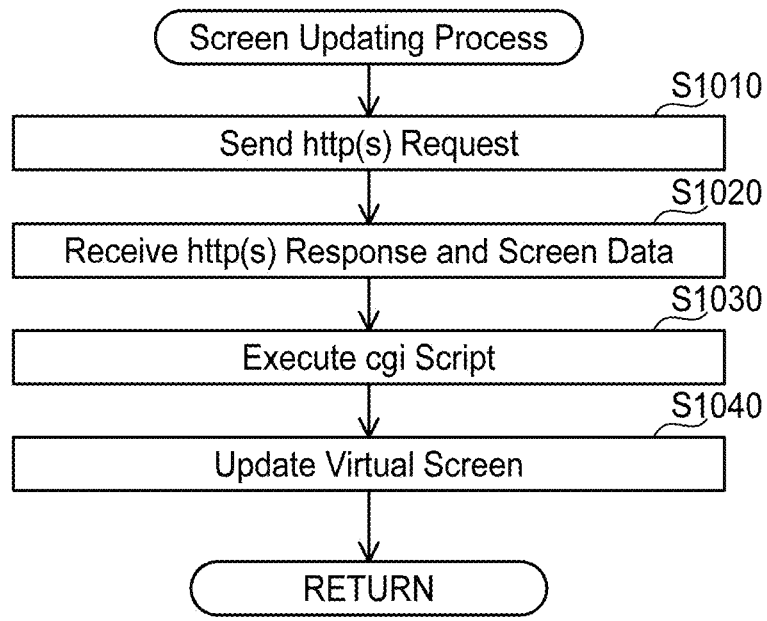
FIG. 10 is a flow chart showing S830 of FIG. 8 and S1140 of FIG. 11, which are a part of the operation of the terminal 200.
Figure 11:
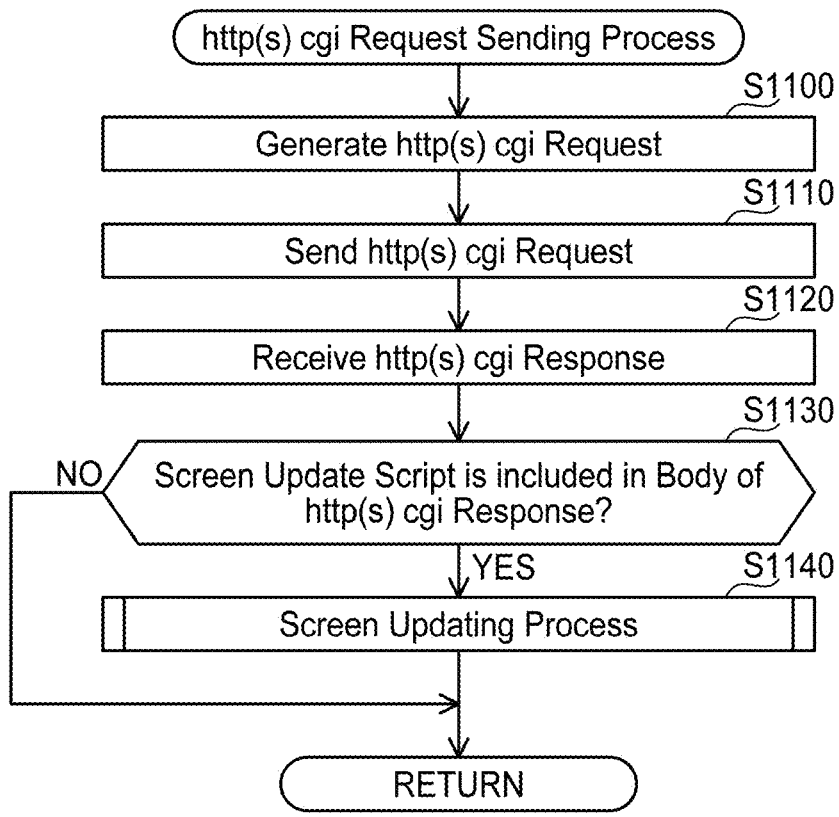
FIG. 11 is a flow chart showing S860, S880, S900 of FIG. 8 and S920, S950 of FIG. 9, which are a part of the operation of the terminal 200.

Contents of the screen updating process will be described with reference to FIG. 10. In S1010, the CPU 211 sends an http(s) request to the MFP 10. In S1020, the CPU 211 receives an http(s) response and screen data from the MFP 10.

In S1030, the CPU 211 executes the various cgi scripts included in the body of the http(s) response. Examples of the cgi scripts are described in S210 to S273. In S1040, the CPU 211 updates the virtual screen being displayed on the remote control screen C1 according to the screen data received in S1020. Due to this, the screen updating process is completed.

Figure 8:
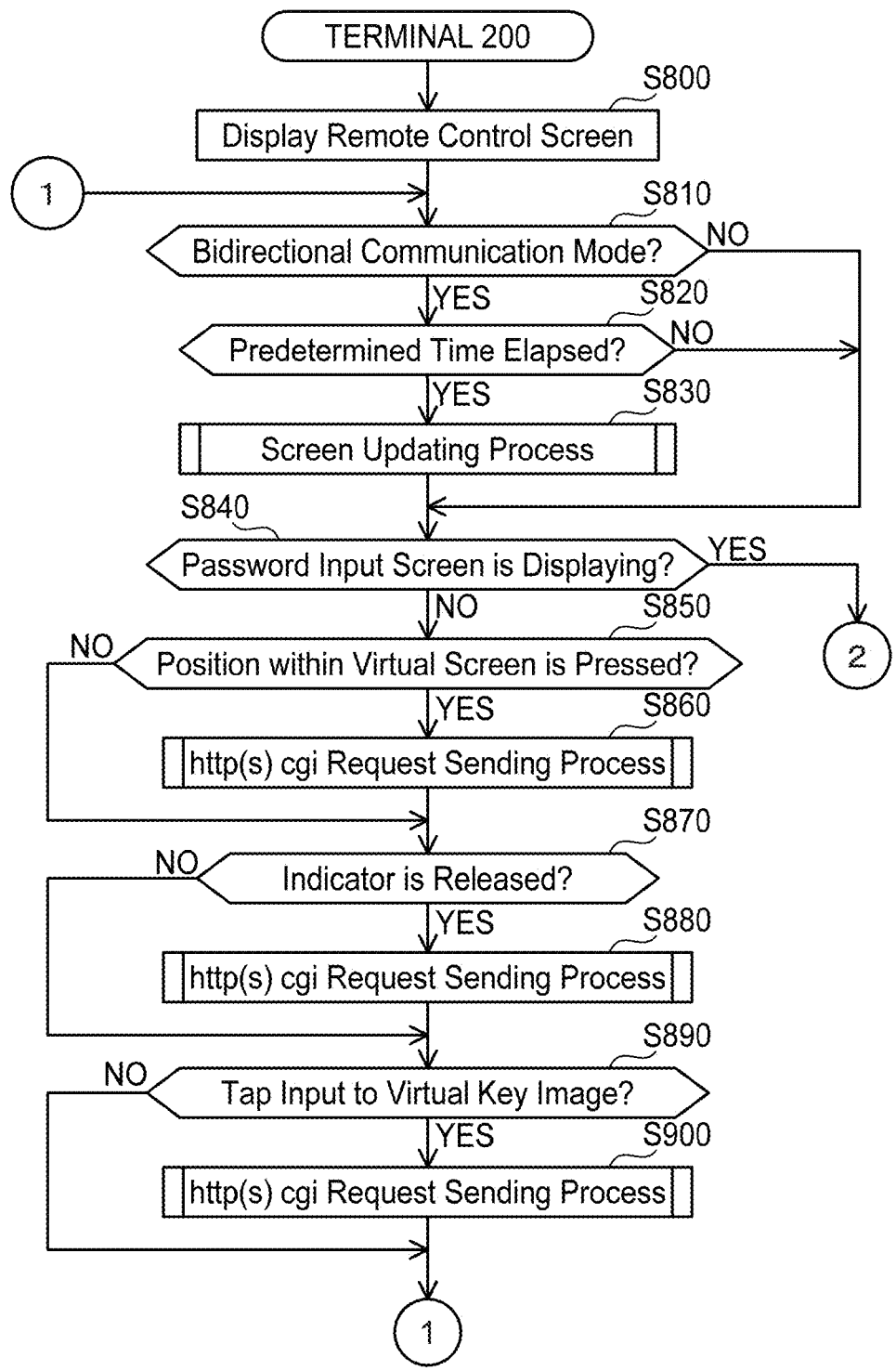
FIG. 8 is a flow chart showing an operation of a terminal 200.
Figure 9:
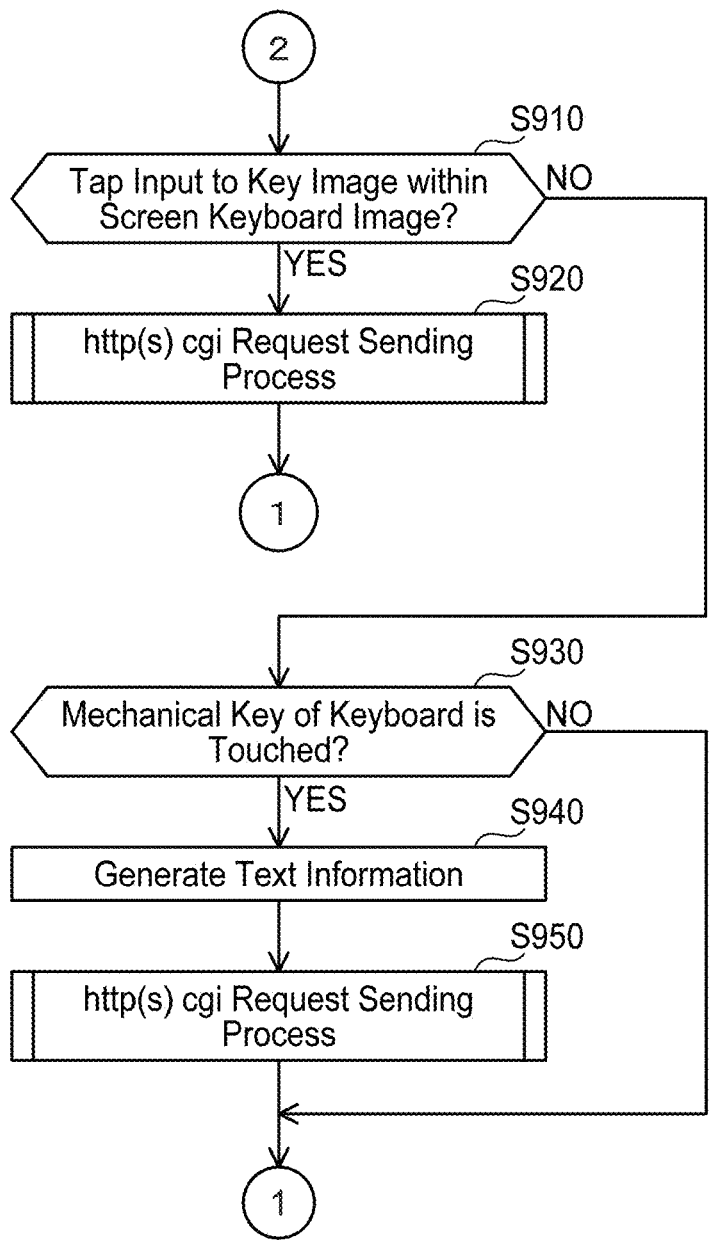
FIG. 9 is a flow chart showing a part of the operation of the terminal 200 (continued from FIG. 8)

The description of FIG. 8 will be continued. In S840, the CPU 211 determines whether or not the virtual screen being currently displayed is the password input screen. When a negative determination is made (S840: NO), the CPU 211 proceeds to S850. In S850, the CPU 211 determines whether or not a position within the virtual screen is pressed. When a negative determination is made (S850: NO), the CPU 211 proceeds to S870, and when an affirmative determination is made (S850: YES), the CPU 211 proceeds to S860.

In S860, the CPU 211 executes an http(s) cgi request sending process. Contents of the http(s) cgi request sending process will be described with reference to FIG. 11. In S1100, the CPU 211 generates an http(s) cgi request corresponding to the operation inputted to the touch panel 217 of the terminal 200. When the operation to press a position within the virtual screen is inputted, the http(s) cgi request including the screen press information and the press coordinate information is generated. In S1110, the CPU 211 sends the generated http(s) cgi request to the MFP 10. In S1120, the CPU 211 receives the http(s) cgi response from the MFP 10. In S1130, the CPU 211 determines whether or not the screen update script is included in the body of the received http(s) cgi response. When a negative determination is made (S1130: NO), the http(s) cgi request sending process is terminated, and when an affirmative determination is made (S1130: YES), the CPU 211 proceeds to S1140. In S1140, the CPU 211 executes the screen updating process. The contents of the screen updating process are described earlier with reference to FIG. 10.

The description of FIG. 8 will be continued. In S870, the CPU 211 determines whether or not the indicator that was in contact with the position in the virtual screen has been released therefrom. When a negative determination is made (S870: NO), the CPU 211 proceeds to S890, and when an affirmative determination is made (S870: YES), the CPU 211 proceeds to S880. In S880, the CPU 211 executes the http(s) cgi request sending process. Due to this, the http(s) cgi request including the release information and the release coordinate information is sent to the MFP 10. The contents of the http(s) cgi request sending process are described earlier with reference to FIG. 11.

In S890, the CPU 211 determines whether or not a tap input is made to one of the virtual key images KV1 to KV3. When a negative determination is made (S890: NO), the CPU 211 returns to S810, and when an affirmative determination is made (S890: YES), the CPU 211 proceeds to S900. In S900, the CPU 211 executes the http(s) cgi request sending process. Due to this, the http(s) cgi request including the virtual key press information is sent to the MFP 10. The contents of the http(s) cgi request sending process are described earlier with reference to FIG. 11.

On the other hand, in S840, when an affirmative determination is made (S840: YES), the CPU 211 proceeds to S910. In S910, the CPU 211 determines which key image within the screen keyboard image included in the password input screen received a tap input. When a negative determination is made (S910: NO), the CPU 211 proceeds to S930, and when an affirmative determination is made (S910: YES), the CPU 211 proceeds to S920. In S920, the CPU 211 executes the http(s) cgi request sending process. Due to this, the http(s) cgi request including the press-release information and the press-release coordinate information is sent to the MFP 10. The contents of the http(s) cgi request sending process are described earlier with reference to FIG. 11.

In S930, the CPU 211 determines whether or not one of the mechanical keys in the keyboard 220 is tapped. When a negative determination is made (S930: NO), the CPU 211 returns to S810, and when an affirmative determination is made (S930: YES), the CPU 211 proceeds to S940. In S940, the CPU 211 generates the text information indicating the letter string inputted through the keyboard 220. In S950, the CPU 211 executes the http(s) cgi request sending process. Due to this, the http(s) cgi request including the text information is sent to the MFP 10. The contents of the http(s) cgi request sending process are described earlier with reference to FIG. 11.

First Operational Example

Figure 15:
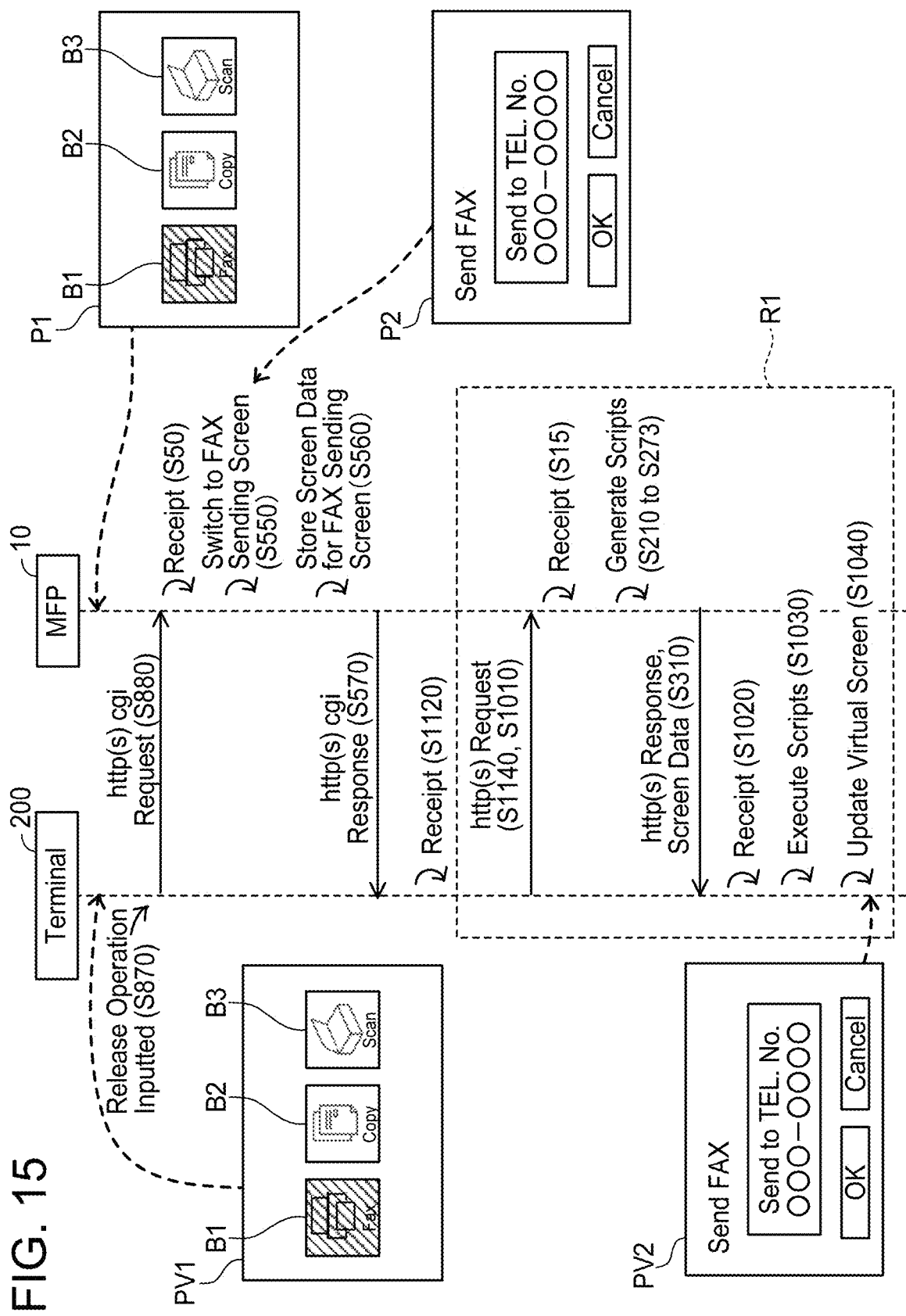
FIG. 15 is a sequence diagram explaining a first operational example.

A first operational example will be described with reference to FIG. 15. In the first operational example, a case will be described in which the user is tapping on the button image B1 in the virtual screen in the terminal 200 as an initial state. In this case, the LCD 16 of the MFP 10 is displaying the home screen P1 in which the button image B1 in the pressed configuration. Further, the remote control screen C1 of the terminal 200 is displaying the virtual screen PV1, in which the button image B1 is being displayed in the pressed configuration.

When the user releases a finger from the button image B1 in the virtual screen PV1 (S870: YES), the http(s) cgi request including the release information and the release coordinate information is sent to the MFP 10 (S880). When the http(s) cgi request is received (S50: YES), the MFP 10 switches the screen to be displayed to the FAX sending screen P2 corresponding to the button image B1 (S550). Further, the MFP 10 stores the screen data of the FAX sending screen P2 in the RAM 13 (S560). The MFP 10 sends the http(s) cgi response including the screen update script to the terminal 200 (S570). The terminal 200 receives this http(s) cgi response (S1120).

Since the screen update script is included (S1130: YES), the terminal 200 sends the http(s) request to the MFP 10 (S1140 and S1010). When the http(s) request is received (S15: YES), the MFP 10 generates various scripts (S210 to S273). The MFP 10 sends the http(s) response including these various scripts, and the screen data of the FAX sending screen P2 to the terminal 200 (S310). The terminal 200 receives this http(s) response and the screen data of the FAX sending screen P2 from the MFP 10 (S1020), and executes the various cgi scripts (S1030). Further, the terminal 200 updates the virtual screen PV1 to a virtual screen PV2 according to the screen data of the FAX sending screen P2 (S1040). Due to this, the virtual screen PV2 including the same contents as the FAX sending screen P2 being displayed on the MFP 10 can be displayed in the terminal 200.

Effects will be described. The MFP 10 can receive the coordinate information from the terminal 200 (S50), switch the screen according to the coordinate information (S550), and send the screen data representing the screen after the switching to the terminal 200 (S310). Due to this, there is no need to communicate various types of dedicated commands for remote control between the MFP 10 and the terminal 200 when the screen of the MFP 10 is to be remotely controlled from the terminal 200. A size of the control program 12a to be stored in the flash memory 12 of the MFP 10 can be suppressed.

The MFP 10 can be caused to function as the Web server, and the browser app 212b of the terminal 200 can be caused to function as a client. Due to this, since the remote control can be performed based on http protocols, there is no need to use programs and commands dedicated to the remote control. The size of the control program 12a and communication load upon the remote control can be suppressed.

In response to the screen having been switched in the MFP 10 (S550), the screen data representing the screen after the switching is generated (S560), and is sent to the terminal 200 (S310). Due to this, the identical contents can be displayed on the screen of the MFP 10 and on the virtual screen of the terminal 200.

When the screen is switched in the MFP 10 (S550), the http(s) cgi response including the screen update script can be sent to the terminal 200 (S570). Due to this, it becomes possible to cause the terminal 200 to execute the screen updating process (S1140) in response to the screen being switched in the MFP 10. Even if the MFP 10 is not set in the bidirectional communication mode (S230: NO), the displayed contents of the virtual screen of the terminal 200 can always match with the displayed contents of the screen of the MPF 10.

Second Operational Example

Figure 16:
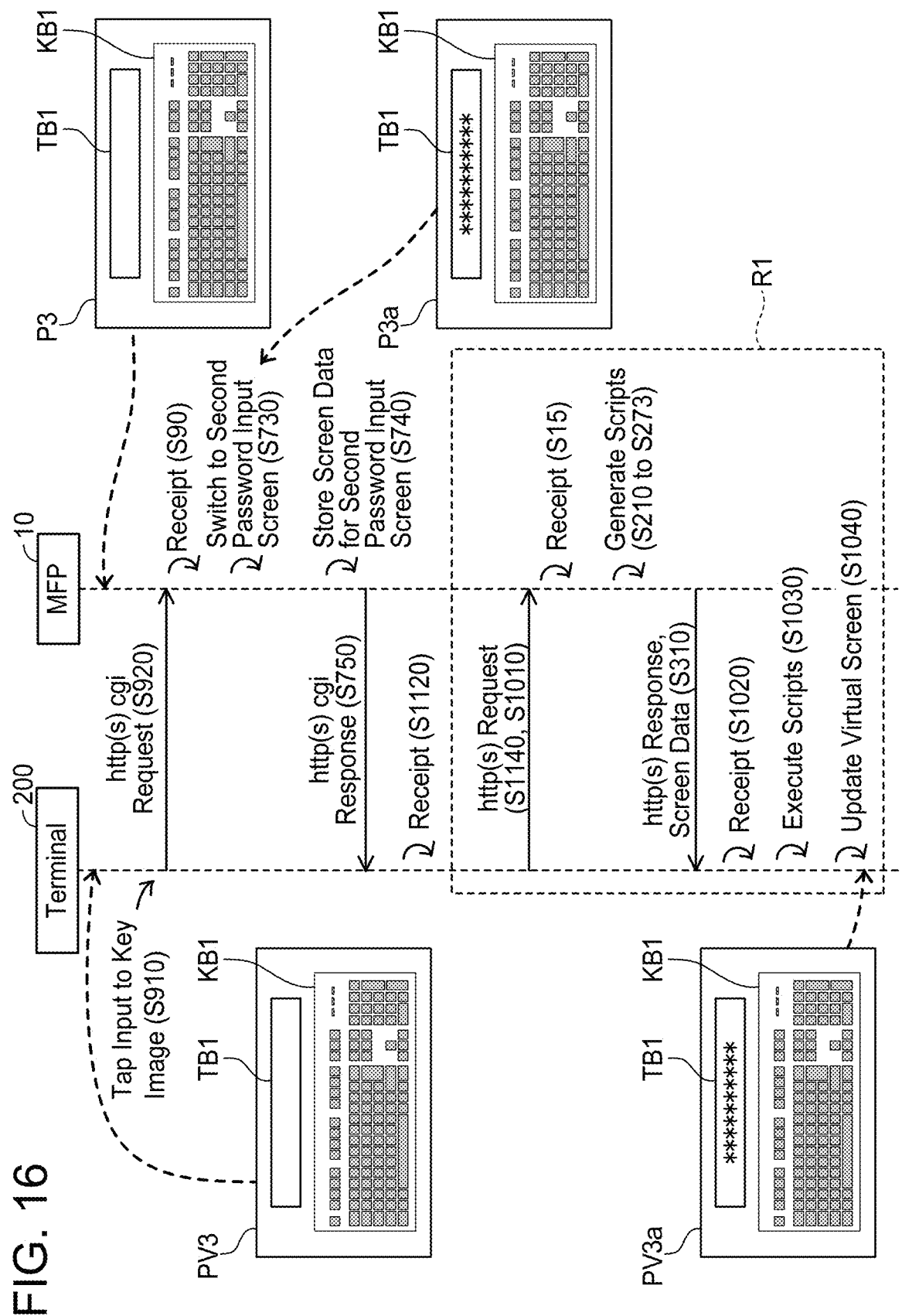
FIG. 16 is a sequence diagram explaining a second operational example.

A second operational example will be described with reference to FIG. 16. In the second operational example, the LCD 16 of the MFP 10 is displaying a first password input screen P3 including the screen keyboard image KB1 and a text input BOX image TB1 in the initial state. Further, the remote control screen C1 of the terminal 200 is displaying a virtual screen PV3 including the identical contents as the first password input screen P3.

When the user taps on one of the key images in the screen keyboard image included in the virtual screen PV3 (S910: YES), the http(s) cgi request including the press-release information and the press-release coordinate information is sent to the MFP 10 (S920). When the http(s) cgi request is received (S90: YES), the MFP 10 executes the screen switching process (S730), and switches to a second password input screen P3a. The second password input screen P3a is a screen in which asterisks indicating that the password has been inputted. In the screen switching process (S730), the pressing process and the releasing process are simultaneously executed. Due to this, the input of the password letter string can be accepted without changing the key image on the screen keyboard image KB1 on the password input screen P3 to the pressed configuration. Since which key image was operated can be kept hidden from the user of the MFP 10, the password exposure can be prevented.

Further, the MFP 10 stores screen data of the second password input screen P3a in the RAM 13 (S740). The MFP 10 sends the http(s) cgi response including the screen update script to the terminal 200 (S750). The terminal 200 receives the http(s) cgi response (S1120). The processes hereafter from S1140 to S1040 are identical to contents of the processes shown in an area R1 of FIG. 15. Due to this, a virtual screen PV3a having identical contents as the second password input screen P3a being displayed on the MFP 10 can be displayed on the terminal 200.

Furthermore, it is to be understood that the technical elements described in the present specification and the drawings exhibit technical usefulness solely or in various combinations thereof and shall not be limited to the combinations described in the claims at the time of filing. The techniques illustrated in the present specification and the drawings are to achieve a plurality of objectives at the same time, and technical usefulness is exhibited by attaining any one of such objectives. Modifications will be described below.

<Variation>

In the screen data reading process of S300, a determination may be made on whether or not the screen being currently displayed on the LCD 16 is the password input screen. When an affirmative determination is made, dummy screen data may be read out instead of the screen data stored in the RAM 13. The dummy screen data is data for displaying a dummy screen for preventing the contents of the password inputted in the terminal 200 from being displayed on the LCD 16 of the MFP 10. Examples of the dummy screen may have a configuration that darkens an entirety of the screen, or that blurs displayed contents. The dummy screen data may be stored in the flash memory 12 in advance. Due to this, the dummy screen can be displayed in the LCD 216 when the virtual screen is updated (S1040) in the terminal 200.

In the above embodiment, the PC terminal was exemplified as the terminal 200 for performing the remote control on the MFP 10 by sending text data, however, it may be a tablet terminal, a smartphone, a cell phone, a digital camera, or a portable music player. In the terminal 200, the input operation was accepted by the touch panel 217, however, no limitation is made to this configuration. The input operation may be accepted by an input device such as a mouse. In this case, the press operation may be accepted by clicking on a left click button, and the release operation may be accepted by releasing the left click button.

Further, in the above embodiment, the case in which the communication between the MFP 10 and the terminal 200 is the Wi-Fi communication under the infrastructure mode using the AP 50, however, it may be of other communication methods, such as a Wi-Fi communication under an adhoc mode which is a direct connection, Bluetooth (registered trademark), cellular telephone network (3G, 4G, etc.), or the Internet.

The STOP key K1, the START key K2, and the HOME key K3 were exemplified as examples of the input keys 15, however, no limitation is made to this configuration. They may be other types of keys, such as a cancel key or a numeric keypad.

Figure 2:
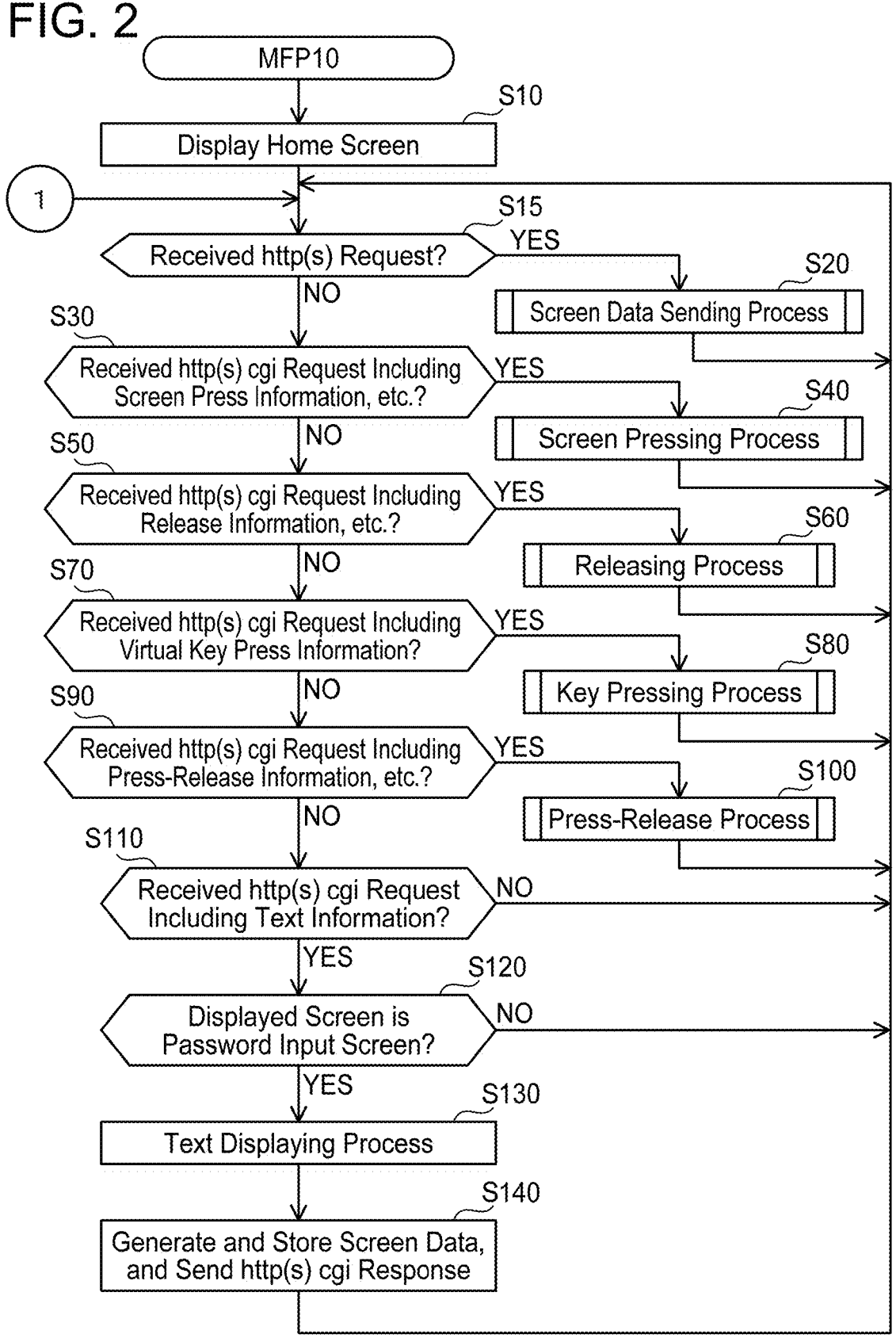
FIG. 2 is a flow chart showing an operation of an MFP 10.

In the process flow of FIGS. 2, S30 and S40 may be omitted. S70 and S80 may be omitted. S90 and S100 may be omitted. S110 to S140 may be omitted. In the screen data sending process (FIG. 3), S230 to S250 may be omitted. In the releasing process (FIG. 5), S510 and S520 may be omitted. According to the above, in general terms, the MFP 10 simply needs to be capable of executing at least displaying a screen including a first image, generating screen data, sending the screen data to the terminal 200, receiving coordinate information from the terminal 200, determining whether or not a position indicated by the coordinate information is within a specific display area within the first image, and switching the screen when the determined position is within the specific display area. As specific examples thereof, a multifunction peripheral 100 simply needs to execute at least one of S10, S440, S550, S640, and S730, at least one of S450, S560, S650, and S740, as well as S310, S50, S540, and S550.

The terminal 200 is an example of an information processing device; the LCD 16 and the touch panel 17 are examples of a touch screen; the MFP 10 is an example of an image processing device; the button images B1 to B3 are examples of a first image; the CPU executing S10, S440, S550, S640, and S730 is an example of displaying a first display screen; the home screen P1 is an example of the first display screen; the FAX sending screen P2 is an example of a second display screen; the LCD 216 is an example of a display; the CPU executing S450, S560, S650, and S740 is an example of generating first screen data; the http(s) request is an example of first request information; the CPU executing S310 is an example of sending the generated first screen data; the CPU executing S50 is an example of receiving coordinate information; the CPU executing S540 is an example of determining whether or not a position indicated by the coordinate information is within a display area of the first image; the CPU executing S550 is an example of switching to the second display screen; the http(s) response is an example of first response information; the CPU executing S210 to S300 is an example of generating first response information; the screen pressing process script and the releasing process script are examples of first instruction information; the http(s) cgi response is an example of second response information; the CPU executing S570 is an example of sending second response information; the screen update script is an example of second instruction information; the periodic update script is an example of third instruction information; the screen data requesting script is an example of fourth instruction information; the STOP key K1 to HOME key K3 are examples of an input module; the virtual key pressing process script is an example of fifth instruction information; the CPU executing S440 is an example of switching a display configuration of the first image; the press-release process script is an example of sixth instruction information; the CPU executing S730 is an example of switching the first display screen without switching a display configuration of a plurality of keys; and the text process script is an example of seventh instruction information.

What is claimed is:

1. An image processing device comprising:
    a communication interface for executing communication with an information processing device;
    a touch screen;
    a memory storing computer-readable instructions; and
    a controller,
    wherein the computer-readable instructions, when executed by the controller, cause the image processing device to perform:
    displaying a first display screen including a first image on the touch screen;
    generating first screen data, which represents the first display screen displayed in the displaying, and which enables a display of the information processing device to display the first display screen;
    generating first response information in a case where first request information is received,
        the first response information including specific instruction information that instructs the information processing device to send a subsequent first request information to the image processing device on condition that the information processing device accepts an input operation to a position within the first display screen;
    sending the generated first response information via the communication interface to the information processing device as a response to the first request information; and
    sending the generated first screen data to the information processing device via the communication interface in a case where the subsequent first request information, which is sent from the information processing device according to the specific instruction information, is received via the communication interface from the information processing device.

2. The image processing device according to claim 1, wherein
    the first image is an image for accepting an input of a display switching instruction to switch the first display screen to a second display screen,
    the computer-readable instructions, when executed by the controller, further cause the image processing device to perform:
    receiving coordinate information via the communication interface from the information processing device,
        the coordinate information indicating a position within the first display screen where the input operation has been inputted;
    determining whether or not the position indicated by the coordinate information is within a display area of the first image; and
    switching to the second display screen associated with the first image in a case where the position indicated by the coordinate information is within the display area of the first image.

3. The image processing device according to claim 2, wherein
    the first response information includes instruction information that instructs the information processing device to receive and send the coordinate information to the image processing device when the information processing device accepts the input operation to a position within the first display screen, and
    the receiving receives the coordinate information sent from the information processing device in accordance with the instruction information.

4. The image processing device according to claim 2, wherein
    the computer-readable instructions, when executed by the controller, further cause the image processing device to perform:

generating second screen data, which represents the second display screen to be displayed after switching from the first display screen in the switching; and sending the generated second screen data to the information processing device via the communication interface.

5. The image processing device according to claim 4, wherein the computer-readable instructions, when executed by the controller, further cause the image processing device to perform:

sending second response information to the information processing device via the communication interface as a response to the coordinate information, when the coordinate information is received in the receiving, wherein the second response information includes instruction information that instructs the information processing device to send a specific first request information to the image processing device, and the sending of the second screen data includes sending the second screen data to the information processing device in a case where the specific first request information, which was sent from the information processing device according to the instruction information, is received.

6. The image processing device according to claim 2, wherein the first response information includes instruction information that instructs the information processing device to periodically send the subsequent first request information to the image processing device, and the sending of the first screen data includes sending the first screen data to the information processing device in the case where the subsequent first request information, which was sent from the information processing device according to the instruction information, is received.

7. The image processing device according to claim 2, further comprising:

an input module configured separately from the touch screen, wherein the first response information includes instruction information that instructs the information processing device to accept an input operation to the input module in the information processing device, and that further instructs the information processing device to send first information to the image processing device when the input operation to the input module is accepted in the information processing device; and switching the first display screen in a case where the first information sent from the information processing device according to the instruction information is received via the communication interface.

8. The image processing device according to claim 2, wherein the input operation includes:
 a first operation for bringing an indicator into contact or close to the touch screen; and
 a second operation for releasing the indicator in contact or close to the touch screen away from the touch screen, the computer-readable instructions, when executed by the controller, further cause the image processing device to perform:

switching a display configuration of the first image in a case where the coordinate information inputted by the first operation is within the display area of the first image, and the switching to the second display screen includes switching the first display screen in a case where the coordinate information inputted by the second operation is within the display area of the first image.

9. The image processing device according to claim 8, wherein the first image is a screen keyboard image including a plurality of key images for inputting a letter string, wherein the first response information includes instruction information that instructs the information processing device to receive and send the coordinate information in a case where the first operation and the second operation are accepted by one of the plurality of key images; and switching the first display screen without switching a display configuration of the plurality of keys in a case where the coordinate information is sent from the information processing device according to the instruction information.

10. The image processing device according to claim 2, wherein the first image is a screen keyboard image including a plurality of key images for inputting a letter string, the first response information includes instruction information that instructs the information processing device to send letter string information, in a case where an operation to input the letter string is accepted in the information processing device, and the letter string information including the inputted letter string, the computer-readable instructions, when executed by the controller, further cause the image processing device to perform receiving the letter string information without switching a display configuration of the plurality of key images, when the letter string information which was sent from the information processing device according to the instruction information is received.

11. The image processing device according to claim 2, wherein the first request information is an http request.

12. The image processing device according to claim 3, wherein the first response information is an http response, and
the instruction information is a script included in a body of the http response.

13. A non-transitory computer-readable recording medium storing computer-readable instructions for an image processing device that comprises:

a communication interface for executing communication with an information processing device;

a touch screen; and a controller, the computer-readable instructions, when executed by a controller of the image processing device, causing the information processing device to perform:

displaying a first display screen including a first image on the touch screen;

generating first screen data, which represents the first display screen displayed in the displaying, and which enables a display of the information processing device to display the first display screen;

generating first response information in a case where first request information is received, the first response information including specific instruction information that instructs the information processing device to send a subsequent first request information to the image processing device on condition that the information processing device accepts an input operation to a position within the first display screen;

sending the generated first response information via the communication interface to the information processing device as a response to the first request information; and sending the generated first screen data to the information processing device via the communication interface in a case where the subsequent first request information, which is sent from the information processing device according to the specific instruction information, is received via the communication interface from the information processing device.

14. The non-transitory computer-readable recording medium according to claim 13, wherein the first image is an image for accepting an input of a display switching instruction to switch the first display screen to a second display screen, the computer-readable instructions, when executed by the controller, further cause the image processing device to perform:

receiving coordinate information via the communication interface from the information processing device, the coordinate information indicating a position within the first display screen where the input operation has been inputted;

determining whether or not the position indicated by the coordinate information is within a display area of the first image; and switching to the second display screen associated with the first image in a case where the position indicated by the coordinate information is within the display area of the first image.

15. An image processing system comprising an image processing device and an information processing device, the image processing device comprising a first communication interface and a touch screen, and the information processing device comprising a second communication interface and a display, wherein the image processing device performs:

displaying a first display screen including a first image on the touch screen; and generating first screen data, which represents the first display screen displayed in the displaying, and which enables a display of the information processing device to display the first display screen, the information processing device performs:

sending first request information to the image processing device via the second communication interface, the image processing device performs:

generating first response information in a case where the first request information is received, the first response information including specific instruction information that instructs the information processing device to send a subsequent first request information to the image processing device on condition that the information processing device accepts an input operation to a position within the first display screen; and sending the generated first response information via the communication interface to the information processing device as a response to the first request information;

the information processing device performs:

sending the subsequent first request information to the image processing device via the second communication interface when the input operation is accepted in the information processing device, the image processing device performs:

sending the generated first screen data to the information processing device via the first communication interface in a case where the subsequent first request information, which is sent from the information processing device according to the specific instruction information, is received via the first communication interface from the information processing device, the information processing device performs:

displaying the first display screen indicated by the first screen data on the display when the first screen data is received from the image processing device via the second communication interface.

16. The image processing system according to claim 15, wherein the first image is an image for accepting an input of a display switching instruction to switch the first display screen to a second display screen, the information processing device performs:

sending coordinate information to the image processing device via the second communication interface when the input operation to a position within the first display screen is accepted, the coordinate information indicating the position where the input operation has been inputted, the image processing device performs:

receiving the coordinate information via the first communication interface from the information processing device;

determining whether or not the position indicated by the coordinate information is within a display area of the first image; and switching to the second display screen associated with the first image in a case where the position indicated by the coordinate information is within the display area of the first image.

\* \* \* \* \*